United States Patent Office 2,849,446
Patented Aug. 26, 1958

2,849,446

CAPROLACTAM CONTAINING 2,6-DI-TERT.-BUTYL-p-CRESOL

Robert H. Sullivan, Woodbury, N. J., assignor to E. I. du Pont de Nemours and Company, Wilmington, Del., a corporation of Delaware No Drawing. Application May 27, 1954
Serial No. 432,927

2 Claims. (Cl. 260—239.3)

The present invention relates to an improved polymer intermediate. More specifically, the present invention relates to a lactam composition suitable for polymerization.

High molecular weight polyamides suitable for use in fibers, fabrics, coating compositions and the like may be obtained by the polymerization of suitable lactams. As these polyamides may be subjected to dyeing or bleaching processes, the starting materials must be free from undesirable color characteristics which would be transmitted to the polymer. A number of processes for the preparation and purification of lactams are known. As polymerization of the lactam immediately after its production is not always possible, storage of the lactam in either a crude or a refined state may be necessary. Unfortunately, when the lactam is stored, epsecially for extended periods of time, undesirable color characteristics often develop which are transmitted to the polyamide on polymerization. This development of undesirable color characteristics in either crude or refined lactam can be retarded by storing the lactam in an atmosphere of nitrogen; however, this method of retarding the development of undesirable characteristics not only is uneconomical but also makes handling of the lactam more difficult.

The object of the present invention is to produce an improved lactam composition for use in the manufacture of high molecular weight polyamides. Another object of the present invention is to produce a caprolactam composition in which the development of undesirable color characteristics either during normal storage or on polymerization is retarded. Additional objects will become apparent as the invention is further described.

I have found that the foregoing objects can be accomplished by incorporating a molten lactam with a small amount of 2,6-di-tert-butyl-p-cresol. The 2,6-di-tert-butyl-p-cresol is incorporated in amounts of 0.01 to 1% by weight with molten caprolactam and the composition thus formed may be stored in either the molten or solid state or polymerized to form polyamides. The invention will find its greatest use in the case of caprolactam, but other solid lactams may also be treated in the same manner.

The 2,6-di-tert-butyl-p-cresol is surprisingly effective in inhibiting the development of undesirable color characteristics in both monomeric and polymerized caprolactam and is far superior to any of the other known inhibiting agents tried, including alkanol amines, dialkyl phenols and naphthol. The di-tert-butyl-p-cresol has the added advantage of being free from any tendency either to interfere with the polymerization reaction or to produce undesirable properties in the finished polymer. The relative effectiveness of these agents can be illustrated by the following table. The various caprolactam samples were prepared by the addition of 0.1% by weight of the additive to flaked lactam and were maintained in the molten state at 100° C. for 48 hours before being polymerized. The color development in both the monomer and polymer was measured by a comparison test similar to the American Public Health Association (A. P. H. A.) test in which the color of a 40% aqueous solution of the lactam sample was compared with that of standards made by dissolving platinic chloride in cobaltous chloride. The lower the numerical values, the less the degree of color.

The compositions comprising lactam and 2,6-di-tert-butyl cresol, herein disclosed, are suitable for polymerization; e. g., they can be polymerized by heating at a temperature above 160°, preferably 200°–250° C.

| Additive | Visual color (after 8 Hrs.) | Color of monomer (based on A.P.H.A. stds.) | | Color of Polymer (A. P. H. A. stds.) |
|---|---|---|---|---|
| | | 24 hrs. | 48 hrs. | |
| None | Light yellow | 20 | 60 | 120 |
| 2,6-di-tert-butyl-p-cresol | do | 30 | 40 | 5 |
| Methanolamine | Medium yellow | 180 | 180+ | 70 |
| Diethanolamine | Light yellow | 50 | 100 | 100 |
| 2,6-dimethylphenol | Medium yellow | 100 | 140 | 60 |
| Beta-naphthol | do | 100 | 180+ | 60 |

Although the invention has been described in detail in the foregoing description, it is apparent that many variations may be made without departing from the basic concept of the invention. I intend, therefore, to be limited only in accordance with the following claims.

I claim:

1. A caprolactam composition suitable for polymerization consisting essentially of caprolactam and from 0.01 to 1% by weight of 2,6-di-tert-butyl-p-cresol.

2. A process for producing a caprolactam composition comprising incorporating 0.01 to 1% by weight of 2,6-di-tert-butyl-p-cresol into molten caprolactam.

References Cited in the file of this patent

UNITED STATES PATENTS 2,241,321    Schlack _____ May 6, 1941

FOREIGN PATENTS 64,435    Netherlands _____ Oct. 15, 1949

OTHER REFERENCES

Wasson et al., Ind. and Eng. Chem., vol. 45, No. 1, January 1953, pp. 197 and 200.

Kitchen et al., Ind. and Eng. Chem., vol. 42, No. 4, April 1950, pp. 675, 679 and 685.